(12) United States Patent
Futatsugi

(10) Patent No.: US 8,140,553 B2
(45) Date of Patent: Mar. 20, 2012

(54) INFORMATION PROCESSING APPARATUS AND INFORMATION PROCESSING METHOD WITH SEARCH FOLDER PROCESSING FOR EXTERNAL DEVICE

(75) Inventor: Hajime Futatsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 433 days.

(21) Appl. No.: 12/257,102

(22) Filed: Oct. 23, 2008

(65) Prior Publication Data

US 2009/0132495 A1 May 21, 2009

(30) Foreign Application Priority Data

Nov. 16, 2007 (JP) .................................. 2007-298595

(51) Int. Cl.
*G06F 17/30* (2006.01)
(52) U.S. Cl. ......... 707/758; 707/796; 707/791; 707/795
(58) Field of Classification Search .................. None
See application file for complete search history.

(56) References Cited

U.S. PATENT DOCUMENTS

| | | | |
|---|---|---|---|
| 6,751,604 B2* | 6/2004 | Barney et al. ........................ 1/1 |
| 6,941,302 B1* | 9/2005 | Suchter ................. 1/1 |
| 6,963,363 B1* | 11/2005 | Ohmura ...................... 348/231.3 |
| 7,142,883 B2* | 11/2006 | Rouse et al. ............... 455/552.1 |
| 7,159,175 B2* | 1/2007 | Ishii et al. ..................... 715/716 |
| 7,392,249 B1* | 6/2008 | Harris et al. .......................... 1/1 |
| 7,421,458 B1* | 9/2008 | Taylor et al. ........................... 1/1 |
| 7,536,561 B2* | 5/2009 | Warnock et al. .............. 713/193 |
| 7,693,746 B2* | 4/2010 | Wachi ......................... 705/26.8 |
| 7,774,426 B2* | 8/2010 | Nakamura et al. ............ 709/217 |
| 7,937,365 B2* | 5/2011 | Prahlad et al. ................ 707/640 |
| 2002/0029205 A1* | 3/2002 | Pedraza et al. ................... 706/21 |
| 2003/0004985 A1* | 1/2003 | Kagimasa et al. ............ 707/500 |
| 2005/0259945 A1* | 11/2005 | Splaver ............................ 386/4 |

FOREIGN PATENT DOCUMENTS

| JP | 2000-057128 | 2/2000 |
| JP | 2002-288016 | 10/2002 |

* cited by examiner

*Primary Examiner* — Debbie Le
(74) *Attorney, Agent, or Firm* — Cowan, Liebowitz & Latman, P.C.

(57) ABSTRACT

This invention allows obtaining desired data even at a copy destination by only a simple copy operation irrespective of differences of search functions upon copying a search folder to an external device. This invention is directed to an information processing method in an information processing apparatus connected to an external device. In this method, when an instruction to copy a search folder to the external device is input, whether or not the search conditions of the designated search folder are executable at the external device is determined, a folder to be transmitted to the external device is generated, data are searched based on a search condition which is determined not to be executable. After data IDs are set in the generated folder so that the obtained by the search data can be acquired via the generated folder, the folder is transmitted to the external device.

8 Claims, 18 Drawing Sheets

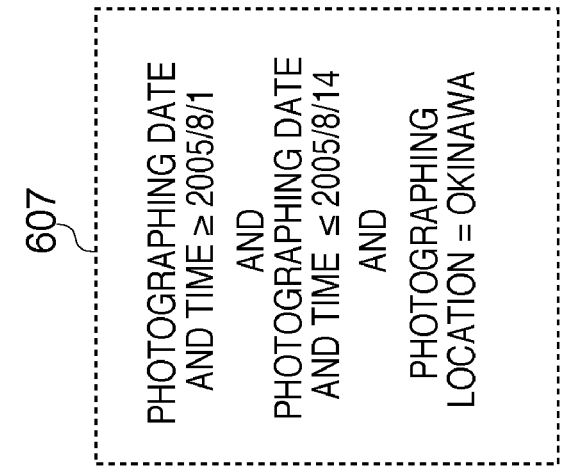
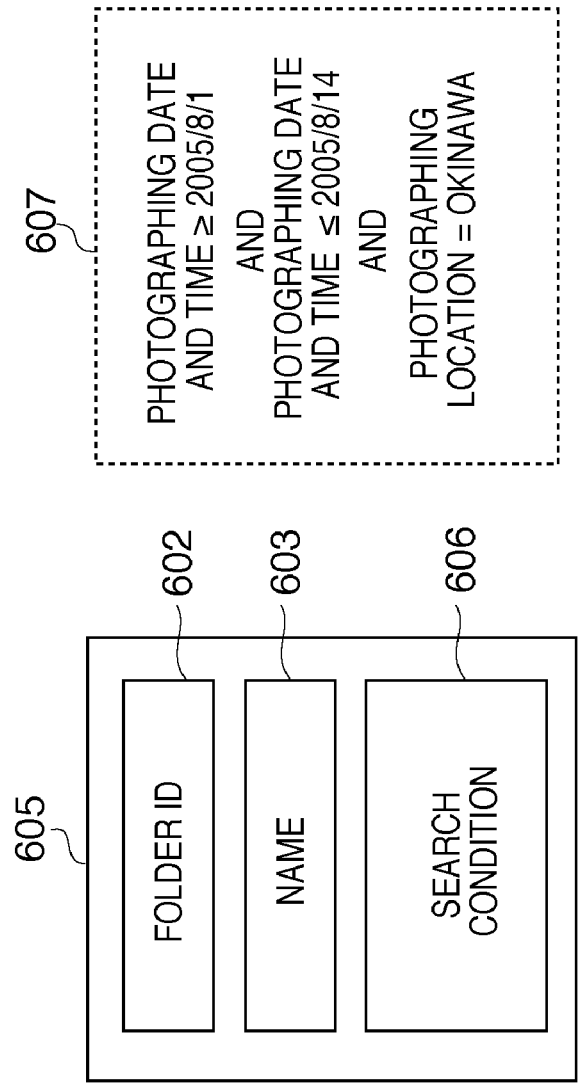
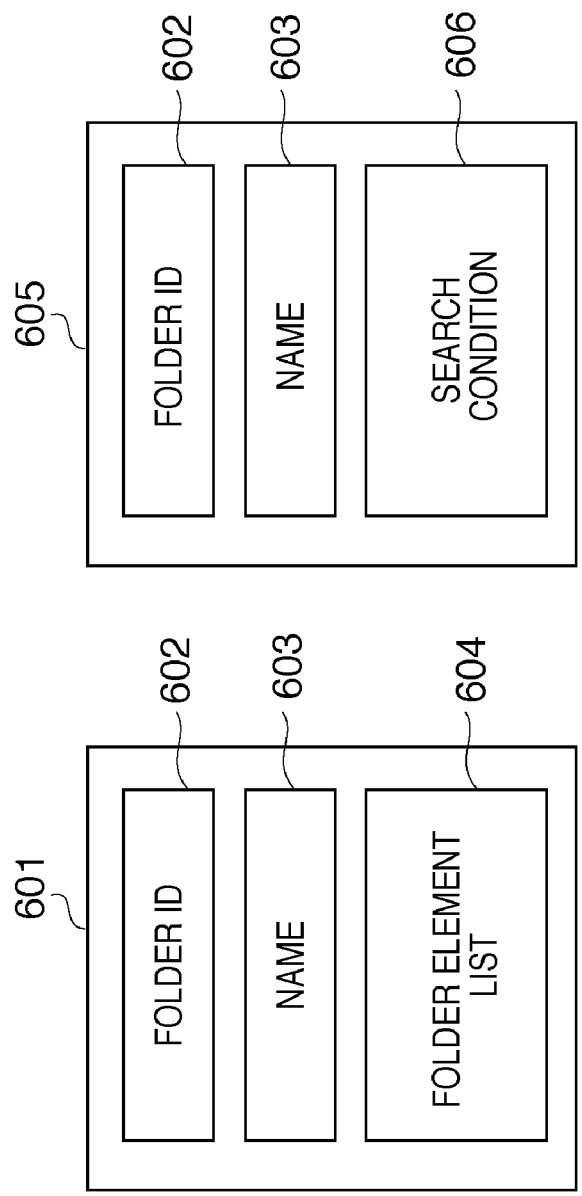

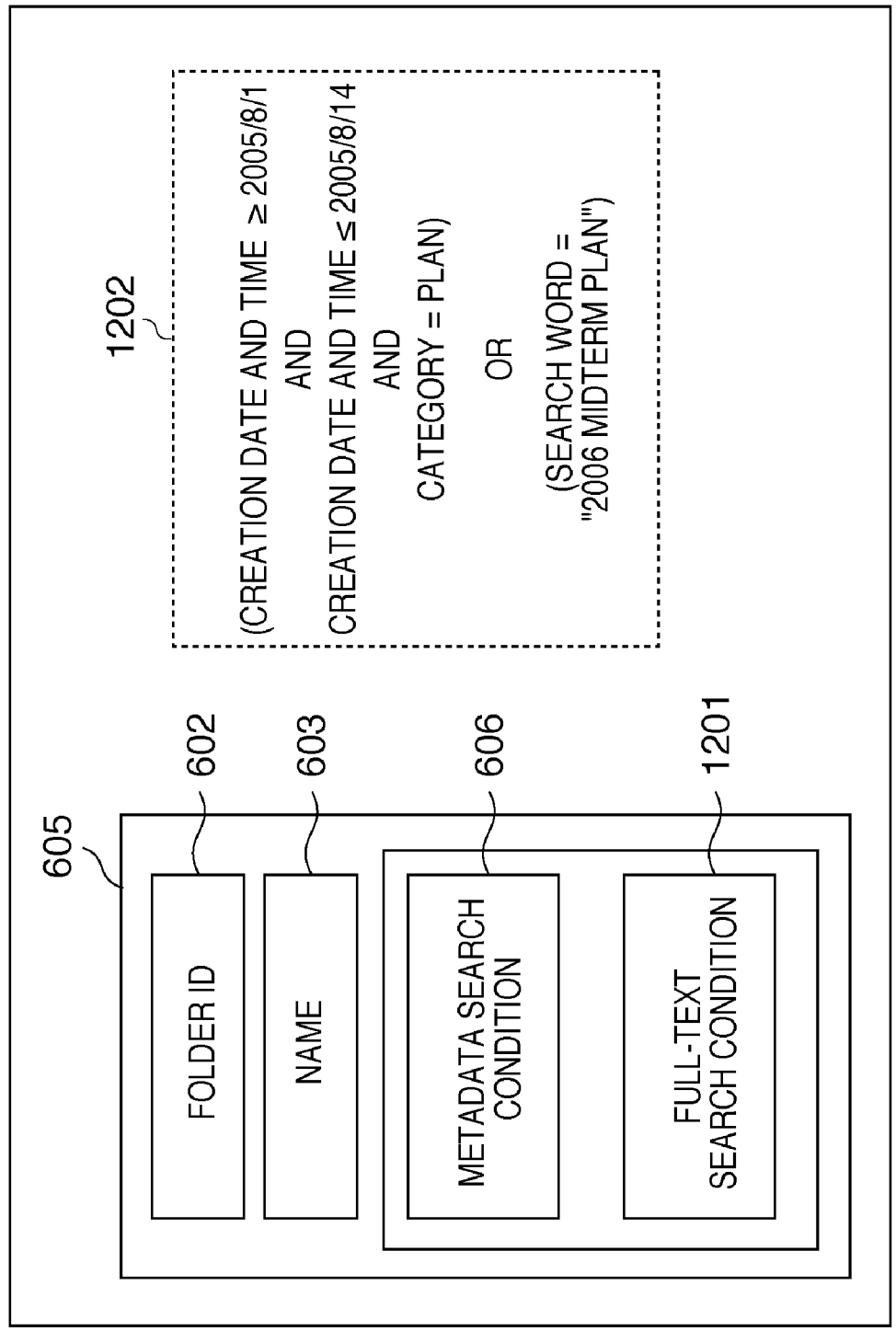

(CREATION DATE AND TIME ≥ 2005/8/1

AND

CREATION DATE AND TIME ≤ 2005/8/14

AND

CATEGORY = PLAN)

{ CREATION DATE AND TIME ≥ 2005/8/1
AND
CREATION DATE AND TIME ≤ 2005/8/14
AND
CATEGORY = PLAN ) }

OR

{ ( DATA ID = DATA_101
OR
DATA ID = DATA_102
OR
DATA ID = DATA_103 ) }

FIG. 16

1601
CATEGORY = HISTORY BOOK
AND
NAME = 三国志 (THREE KINGDOMS)

1602
CATEGORY = HISTORY BOOK
AND
(NAME = 三国志 (THREE KINGDOMS)
OR
NAME = 三國志 (THREE KINGDOMS))

INFORMATION PROCESSING APPARATUS AND INFORMATION PROCESSING METHOD WITH SEARCH FOLDER PROCESSING FOR EXTERNAL DEVICE

BACKGROUND OF THE INVENTION

1. Field of the Invention

The present invention relates to an information processing technique for making data management using a search folder.

2. Description of the Related Art

Conventionally, data are classified and managed using folders configured to have a hierarchical structure. However, in order to efficiently manage data in large quantities, the use of only static folders (to be referred to as "classification folders" hereinafter) used to merely classify data storage locations has its limitations. For this reason, recently, data management using a "search folder" which dynamically classifies data according to a search condition based on the attributes of data has been proposed.

For example, Japanese Patent Laid-Open No. 2000-057128 has proposed a method of conducting an attribute search by opening an attribute search item linked with a search condition, and acquiring a data set that matches the search condition. Using such a search folder, a desired data set can be dynamically acquired without managing all static relationships between data and folders, and data management cost can be reduced.

Furthermore, Japanese Patent Laid-Open No. 2002-288016 has proposed a method of explicitly adding data and folders which do not match a search condition, and displaying them together with data and folders as the search result. According to this method, the user can input and output data in the search folder in the same manner as in the conventional classification folders, and the search folder having a small operational feeling difference from the classification folders can be implemented.

By building a data management system that seamlessly uses both the search and classification folders after their operational feeling difference is reduced, the user's convenience upon managing data in large quantities can be improved.

In such a data management system, it is desirable if one can copy data in the search folder by the same copy operation as in the classification folders.

For example, a case will be examined below wherein an active search folder including its contents (data to be searched by the search folder) is simultaneously copied to a mobile PC, and copied data are used on the mobile PC. In this case, the user may expect to search for desired data as in the copy source by opening the search folder on the mobile PC.

When the single hierarchical structure includes both classification and search folders, the user may expect to make a copy operation without considering whether or not a folder to be copied is the search folder.

However, upon copying the search condition set in the search folder based on the copy operation intact, the following problems are posed.

First, when a copy source device and copy destination device (the copy source device is an independent external device) have differences between their search functions, not all searches designated in the search condition can be conducted in the copy destination device. In this case, the user cannot obtain desired data even when he or she opens the search folder in an external device as a copy destination.

In this way, when the classification folder is copied, the contents of that folder remain the same. However, when the search folder is copied, some contents of the folder may be omitted. Such a problem bottlenecks the use of both the folders without regarding their differences.

For this reason, upon copying the search folder to an external device, it is imperative that data that the user wants can be obtained even at the copy destination.

Second, when the search folder is copied to an external device having no search function, it cannot be copied as the search folder. In this case, the user has to generate a classification folder on the external device as the copy destination, and manually copy data obtained by the search folder on the copy source device to the generated classification folder, resulting in a serious demerit in terms of data management cost.

As described above, in order to use the search and classification folders together in the data management system, the operability upon copying the search folder to an external device has to be improved.

SUMMARY OF THE INVENTION

The present invention has been made in consideration of the aforementioned problems.

An information processing apparatus which is connected to an external device to be able to communicate with each other, comprises:

a determination unit configured to determine, when an instruction to copy a search folder used to search data based on set search conditions to the external device is input, whether or not the search conditions set in the designated search folder are executable at the external device;

a generation unit configured to generate a folder to be transmitted to the external device based on the instruction;

a search unit configured to search data based on a search condition which is determined not to be executable at the external device of the search conditions set in the designated search folder;

a setting unit configured to set information associated with data obtained by the search by the search unit in the generated folder so that the data can be acquired via the generated folder; and a transmission unit configured to transmit the folder set with the information associated with the data by the setting unit to the external device.

According to the present invention, upon copying a search folder to an external device, desired data can be obtained even at a copy destination by a simple copy operation irrespective of differences of search functions.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A to 6C are views showing an example of the configurations of a classification folder and search folder to be managed by the PC 101 and photo viewer 102;

FIG. 12 is a view showing an example of the configuration of a search folder in the MFP 901;

FIG. 14 is a view showing an example of a search condition which can be executed by a search function available at a copy destination;

FIG. 15 is a view showing an example of a search condition obtained when data are explicitly set in a search folder; and FIG. 16 is a view showing an example of a search condition of a search folder to be copied to the MFP 902 according to the third embodiment of the present invention.

DESCRIPTION OF THE EMBODIMENTS

Preferred embodiments of the present invention will now be described in detail in accordance with the accompanying drawings.

In the following description, an "information processing apparatus" indicates all devices each of which mounts a "data management system" to be described later. That is, the information processing apparatus in the embodiments to be described hereinafter includes various devices each of which mounts the "data management system", that is, not only a so-called personal computer (PC), but also a digital camera, MFP, and the like.

First Embodiment

<Configuration of Network System>

Figure 1:
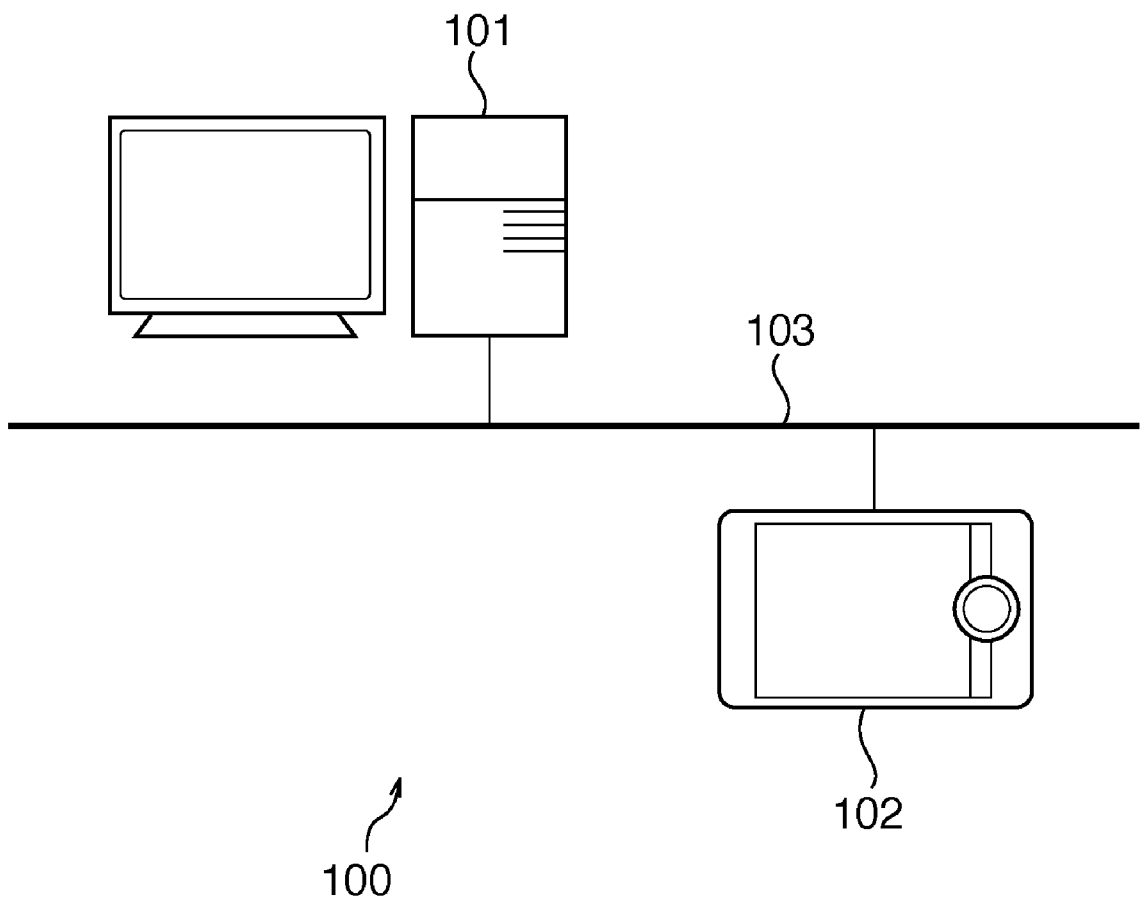
FIG. 1 is a view showing the configuration of a network system 100 which comprises information processing apparatuses according to the first embodiment of the present invention.

FIG. 1 is a view showing the configuration of a network system 100 which comprises information processing apparatuses according to the first embodiment of the present invention.

Referring to FIG. 1, reference numeral 101 denotes a PC; and 102, a photo viewer. The PC 101 and photo viewer 102 are connected via a network 103. On both the PC 101 and photo viewer 102, a "data management system" as a data classification/management program used to implement an information processing method according to the present invention is mounted. With this system, the PC 101 and photo viewer 102 can exchange data with each other.

By using this data management system, the user can classify photo data into folders on the PC 101, and can copy folders generated on the PC 101 to the photo viewer 102 to browse photos. Note that photo data saved in the PC 101 in this embodiment are synchronized with those saved in the photo viewer 102.

<Hardware Arrangement of Each Information Processing Apparatus that Configures Network System 100>

Figure 2:
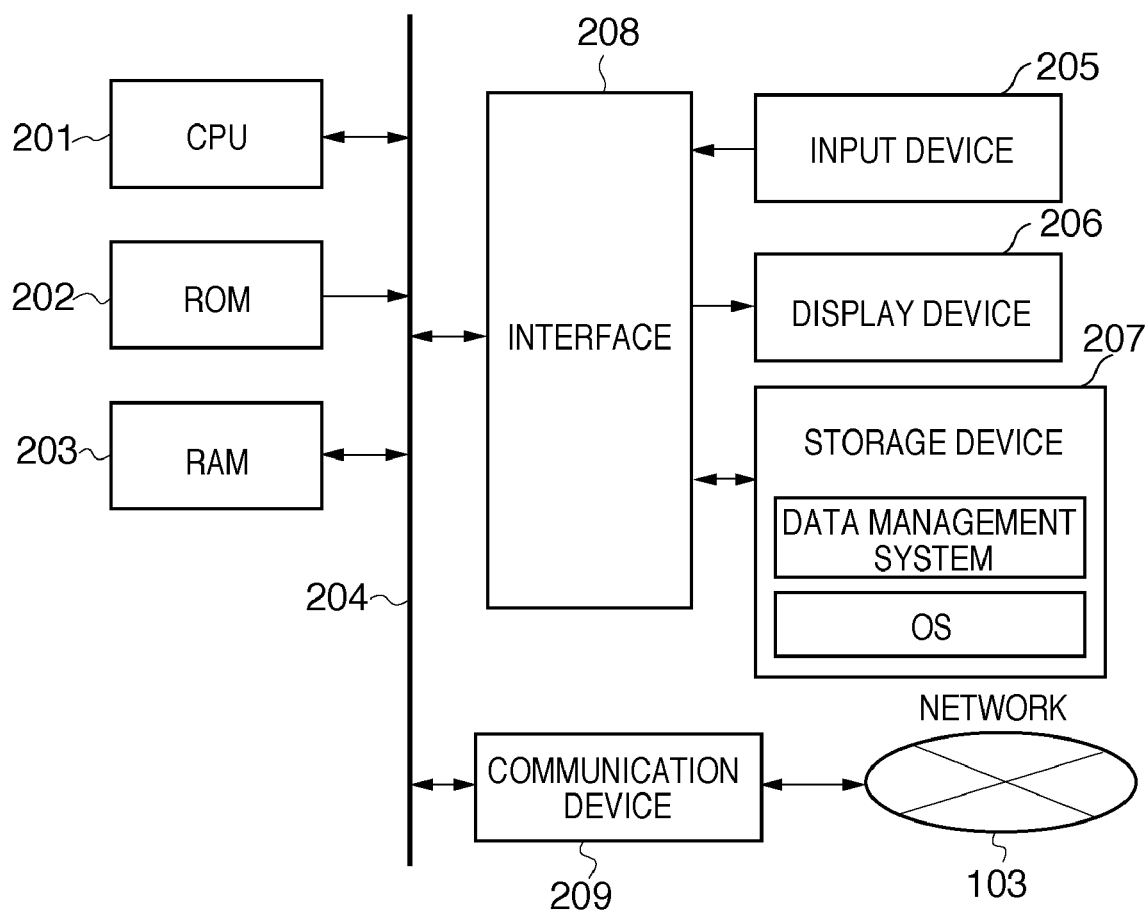
FIG. 2 is a block diagram showing the hardware arrangement of each device (PC 101 and photo viewer 102) which configures the network system 100.

FIG. 2 is a block diagram showing the hardware arrangement of each information processing apparatus (PC 101 and photo viewer 102) which configures the network system 100.

A CPU 201 controls respective units by executing an OS (Operating System) and various application programs including the data management system. A ROM 202 stores programs to be executed by the CPU 201 and permanent data of calculation parameters.

A RAM 203 provides a work area and data temporary storage area of the CPU 201. The ROM 202 and RAM 203 are connected to the CPU 201 via a bus 204.

An input device 205 such as a keyboard and the like, a display device 206 such as a CRT, liquid crystal display, or the like, and a storage device 207 such as an HDD, MO, CD-ROM, or the like, which saves label template data, are connected to the bus 204 via an interface 208.

The bus 204 is connected to the network 103 via a communication device 209.

<Module Configuration of Data Management System Mounted on PC 101>

Figure 3:
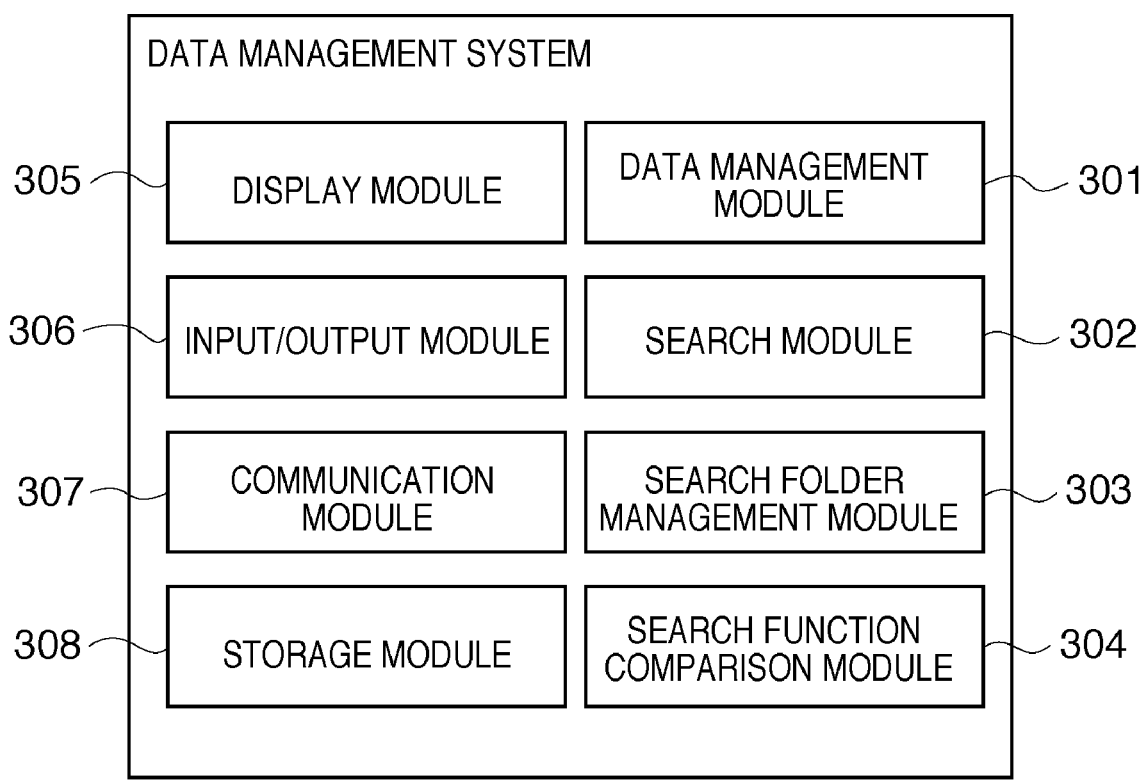
FIG. 3 is a diagram showing the module configuration of the PC 101.

FIG. 3 is a diagram showing the module configuration of the data management system mounted on the PC 101. Reference numeral 301 denotes a data management module, which manages photo data and metadata appended to the photo data, and classification folders used to classify photo data.

Reference numeral 302 denotes a search module, which executes search processing of metadata appended to photo data. Reference numeral 303 denotes a search folder management module which manages generation and copying of a search folder. Reference numeral 304 denotes a search function comparison module which communicates with the photo viewer 102 via a communication module 307 to exchange information associated with search functions, and compares search functions.

Reference numeral 305 denotes a display module which executes display control for displaying photo data and folders on the display device 206. Reference numeral 306 denotes an input/output module, which accepts input and output of various operations made via the input device 205 and data. Reference numeral 308 denotes a storage module which controls processing for storing photo data, metadata, and folders in the storage device 207.

<Module Configuration of Data Management System Mounted on Photo Viewer 102>

Figure 4:
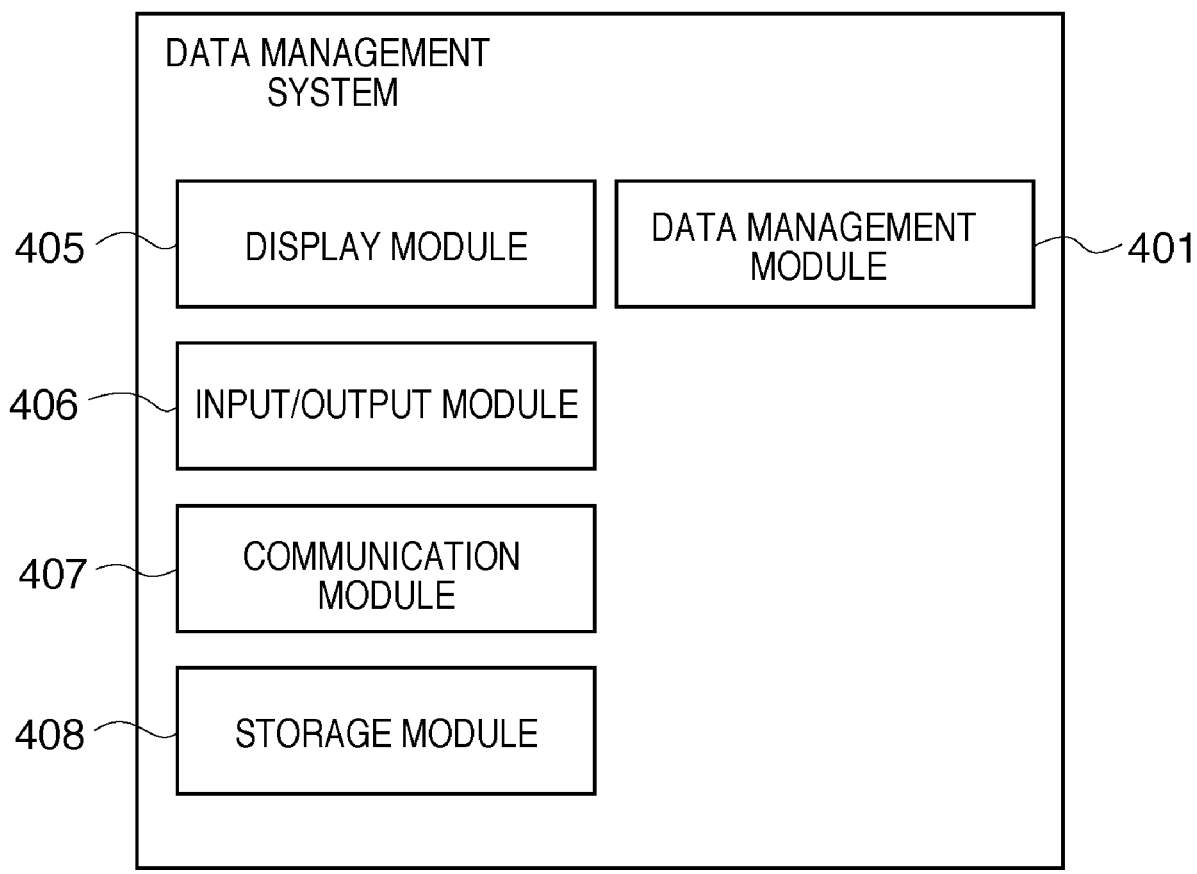
FIG. 4 is a diagram showing the module configuration of the photo viewer 102.

FIG. 4 is a diagram showing the module configuration of the data management system mounted on the photo viewer 102. Modules 401 and 405 to 408 have the same functions as those of the modules 301 and 305 to 308, and a repetitive description thereof will be avoided. Assume that the data management system mounted on the photo viewer 102 in this embodiment does not have any search function.

<Configurations of Data and Folders to be Managed>

Figure 5:
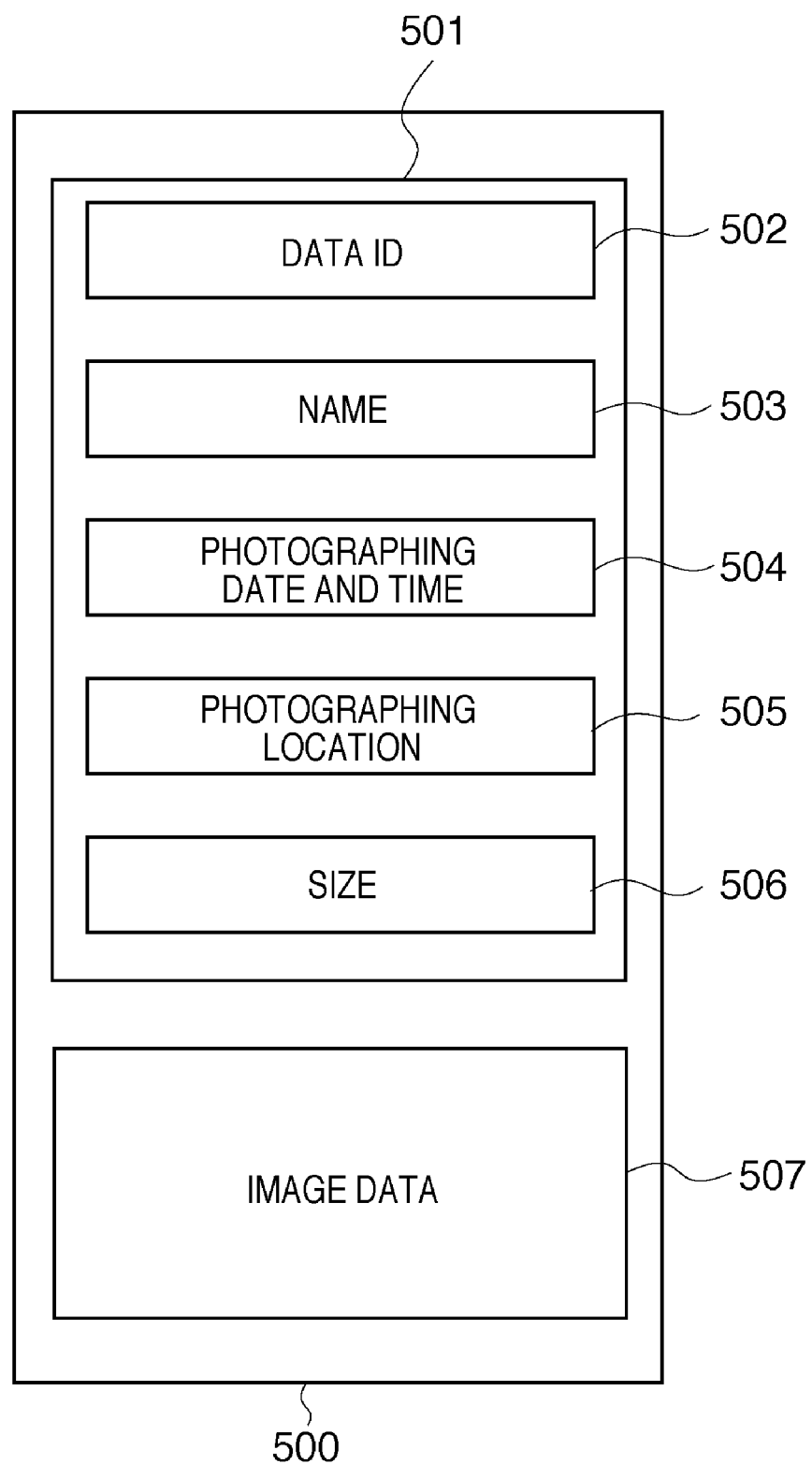
FIG. 5 is a view showing an example of the configuration of photo data to be managed by the PC 101 and photo viewer 102.

FIG. 5 is a view showing an example of the configuration of photo data to be managed by the PC 101 and photo viewer 102 in this embodiment (assume that each photo data is stored in the storage device 207). Photo data 500 includes metadata 501 and image data 507.

The metadata 501 indicates the attributes of the photo data, and includes attribute information such as data ID information (an identifier used to identify data) 502, name information 503, photographing date and time information 504, photographing location information 505, size information 506, and the like. On the other hand, the image data 507 is body data of the photo data 500, and is, for example, data of JPEG or the like.

FIGS. 6A and 6B are views showing an example of the configurations of a classification folder and search folder to be managed by the PC 101 or photo viewer 102 in this embodiment (assume that these folders are stored in the storage device 207).

Referring to FIG. 6A, reference numeral 601 denotes a classification folder, which is configured by folder ID information 602, name information 603, and a folder element list 604. The folder element list 604 is set with the data ID information 502 of each of photo data stored in this folder 601.

Referring to FIG. 6B, reference numeral 605 denotes a search folder which comprises folder ID information 602 and name information 603 as in the classification folder. Furthermore, the search folder 605 includes search condition information 606. In this embodiment, a search condition included in the search condition information 606 is set based on respective pieces of information included in the metadata 501. That is, the search condition is expressed by coupling logics of match conditions with respect to respective pieces of information included in the metadata 501 shown in FIG. 5.

FIG. 6C is a view showing an example of a practical search condition included in the search condition information 606. According to a search condition 607, photo data, the photographing date and time information of the metadata of which falls within the range from "Aug. 1, 2005" to "Aug. 14, 2005", and the photographing location information of which is "Okinawa", are obtained by the search.

When an instruction to open in the search folder is input to the data management module 301, the data management module 301 reads out the search condition 607 from the designated search folder, and instructs the search module 302 to conduct a metadata search.

The search module 302 searches metadata of photo data according to the search condition read out from the search folder, and returns a list of photo data having metadata that match the search condition to the data management module 301. The data management module 301 displays the list of photo data acquired from the search module 302 as the search result on the display device 206 via the display module 305. As a result, the list of photo data obtained by the search by the search folder 605 is displayed on the display device 206.

<Configuration of User Interface>

Figure 7:
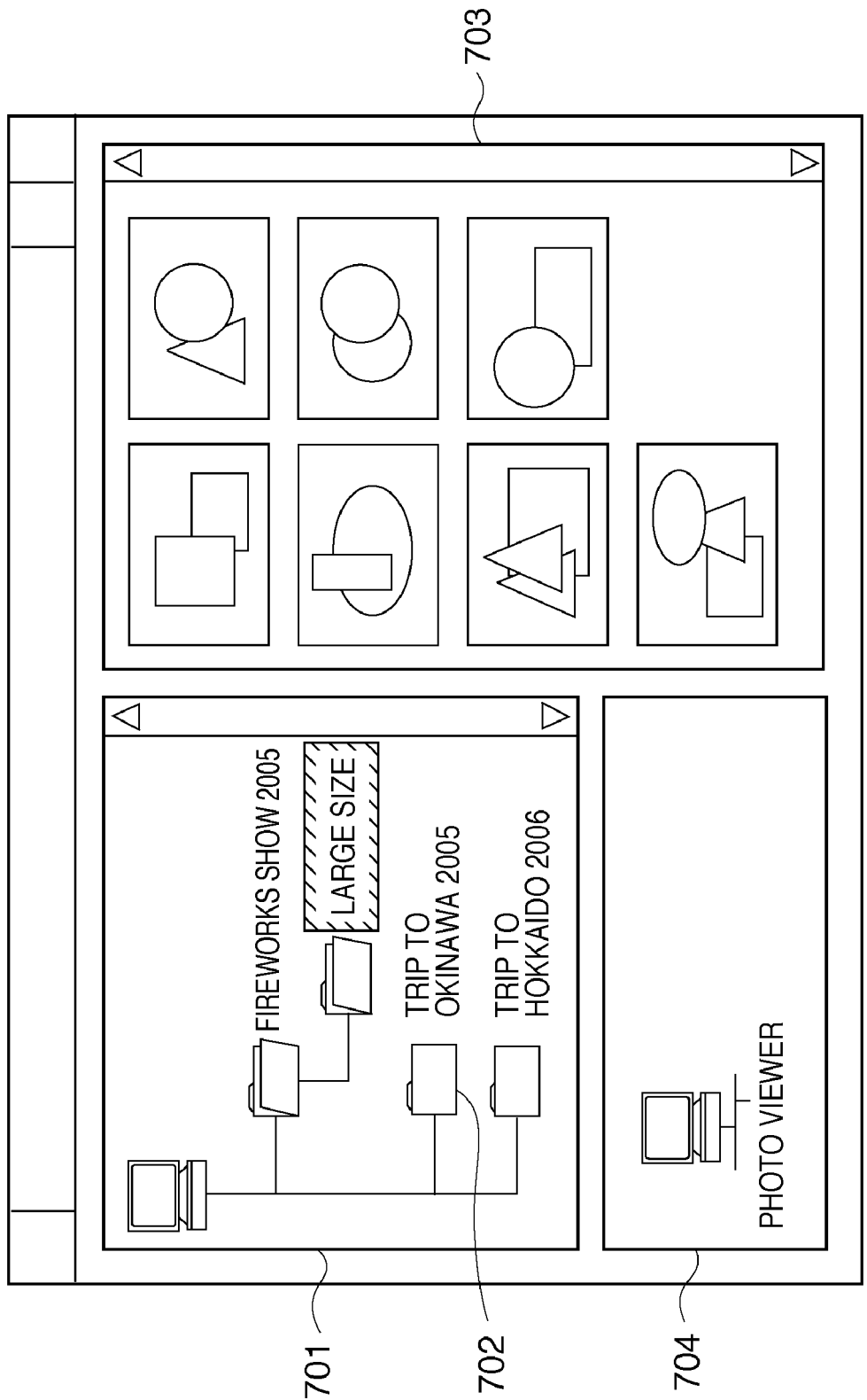
FIG. 7 is a view showing an example of a user interface of a data management system.

FIG. 7 is a view showing an example of a user interface of the aforementioned data management system.

Referring to FIG. 7, reference numeral 701 denotes a folder display area, which displays both classification and search folders. In this embodiment, a search folder is hierarchized as a part of a folder tree of classification folders. Assume that a folder 702 is a search folder, and is set with the search condition shown in FIG. 6C.

Reference numeral 703 denotes a photo list display area, which displays a list of photo data classified to a classification folder selected on the folder display area 701, and photo data having metadata that match the search condition of a search folder selected on the folder display area 701.

Reference numeral 704 denotes an external device display area, which displays an external device connected to allow communications via the network. In this case, the photo viewer 102 is displayed. Upon recognizing an external device, UPnP, SMB, and the like are generally used. However, the present invention is not limited to such specific protocols, and can recognize an external device using an arbitrary protocol.

<Sequence of Copying Processing of Search Folder to Photo Viewer 102 by PC 101>

Figure 8A:
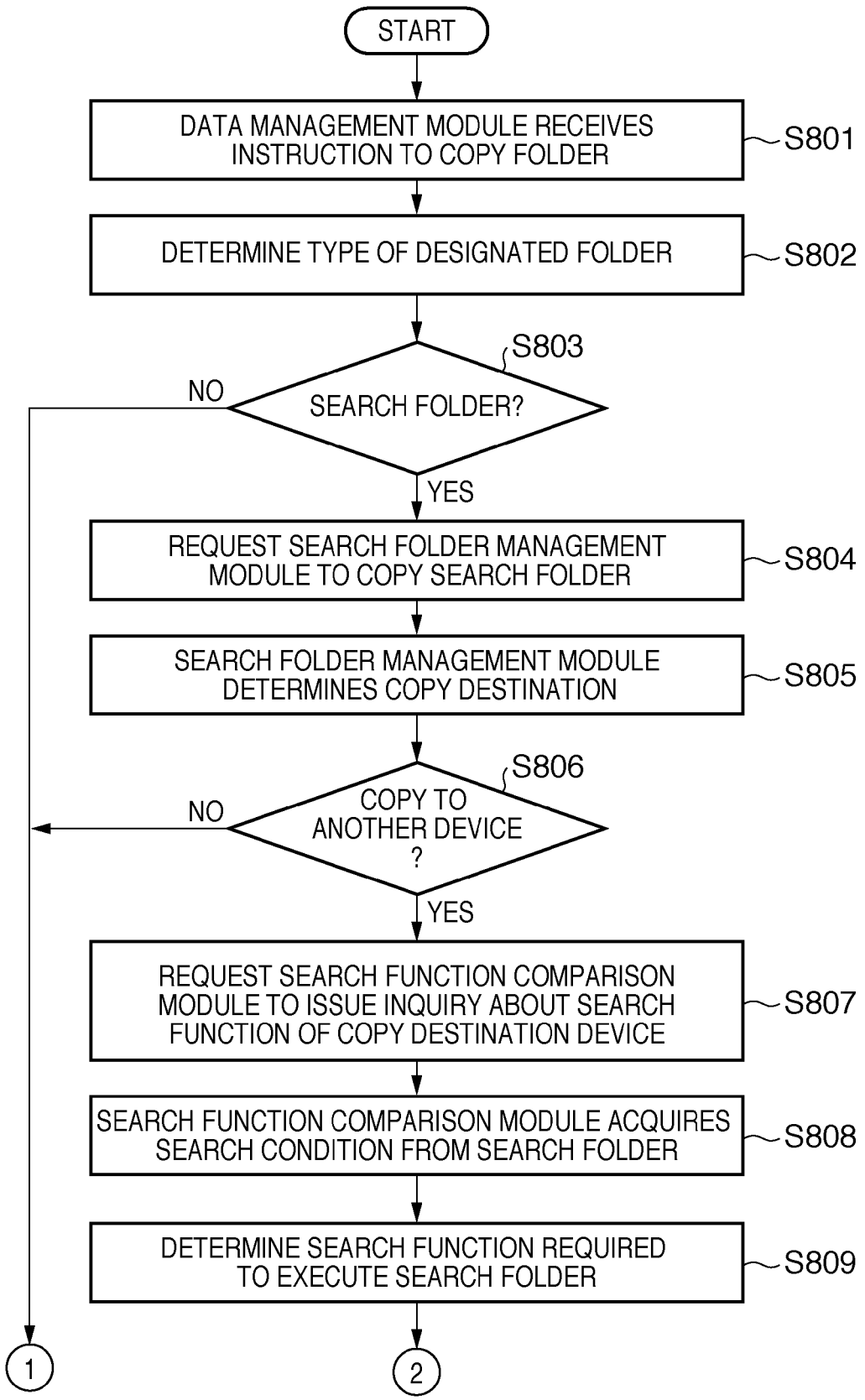
FIGS. 8A and 8B are flowchart showing the sequence of copy processing of a search folder in the PC 101 to the photo viewer 102.
Figure 8B:
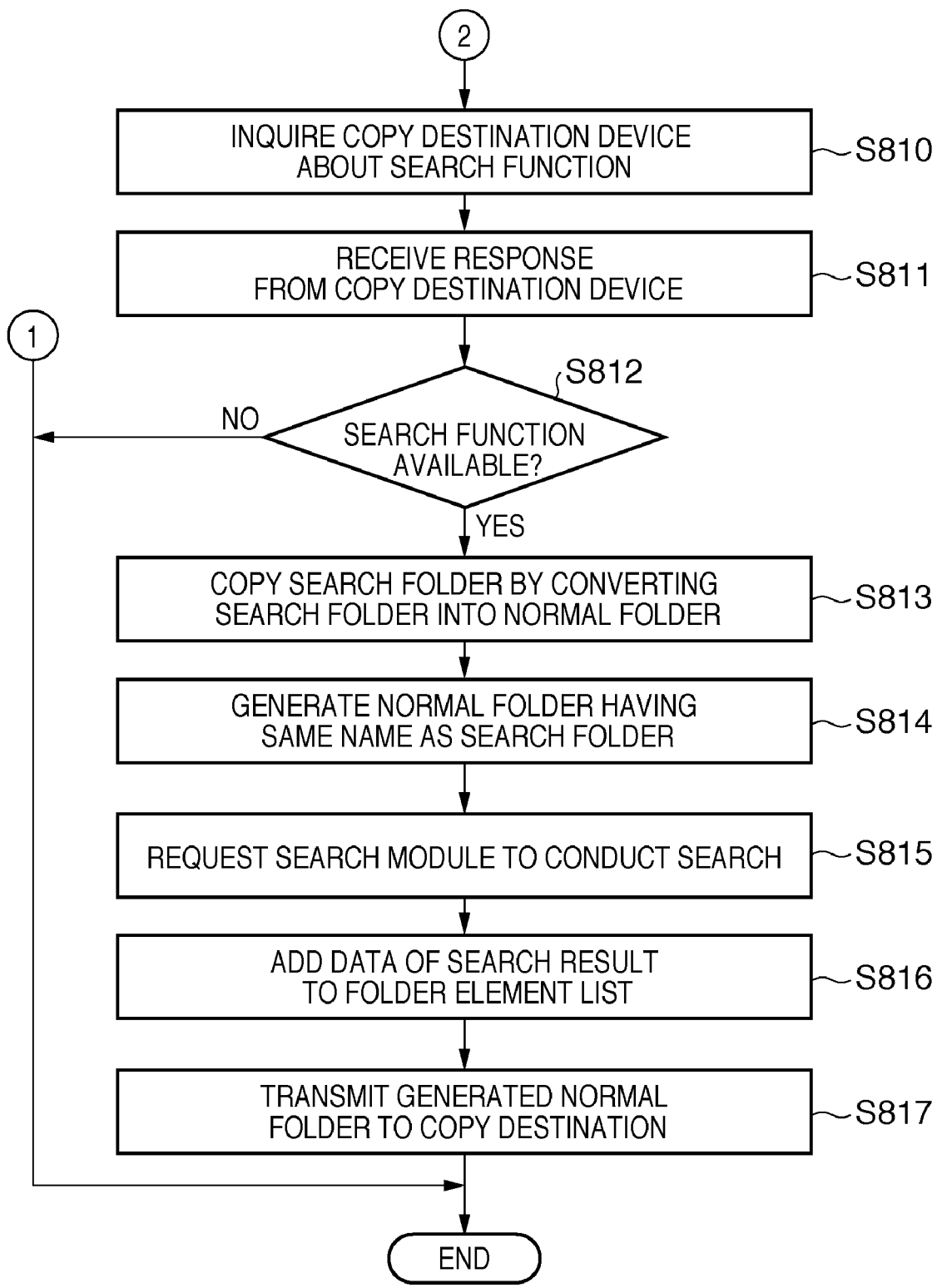

The sequence of processing in the data management system upon copying a search folder from the PC 101 to the photo viewer 102 will be described below with reference to the flowchart of FIGS. 8A and 8B.

When the user selects the search folder 702 on the folder display area 701 of the user interface shown in FIG. 7, and gives the instruction to copy the selected folder to the photo viewer 102, the data management module 301 accepts the copy instruction of that folder in step S801.

The data management module 301 checks in step S802 if the folder selected by the copy instruction is a classification folder or search folder.

As a result of checking in step S802, if it is determined that the selected folder is a classification folder, the process branches in step S803 to end the processing. On the other hand, as a result of checking in step S802, if it is determined that the selected folder is a search folder, the process branches in step S803 and advances to step S804.

In step S804, the data management module 301 requests the search folder management module 303 to execute copy processing of the search folder.

The search folder management module 303 checks in step S805 based on the copy processing request if a copy destination is a location inside the self device or an external device. As a result of checking in step S805, if it is determined that the copy destination is a location inside its own, the process branches in step S806 to end the processing. On the other hand, as a result of checking in step S805, if it is determined that the copy destination is an external device, the process branches in step S806 and advances to step S807.

In step S807, the data management module 301 requests the search function comparison module 304 to send an inquiry about the search function of the external device as the copy destination. The search function comparison module 304 acquires a search condition from the search folder selected by the copy instruction in step S808, and determines a search function required to execute the search folder based on the acquired search condition in step S809. Since the search folder 702 is set with a metadata search function as a search condition, the search function comparison module 304 determines the presence/absence of a metadata search function as the search function required to execute the search folder.

In step S810, the search function comparison module 304 sends an inquiry about the presence/absence of the search function determined in step S809 to the photo viewer 102 via the communication module 307 (more specifically, the module 304 inquires the photo viewer 102 as to whether or not it has a metadata search function).

In step S811, the search function comparison module 304 receives a response to the inquiry from the photo viewer 102 as the copy destination external device. The search function comparison module 304 checks in step S812 based on the inquiry result from the photo viewer 102 if the photo viewer 102 has the metadata search function.

If it is determined in step S812 that the photo viewer 102 as the copy destination external device has the metadata search function, the processing ends. On the other hand, if it is determined in step S812 that the photo viewer 102 as the copy destination external device does not have any metadata search function, the process advances to step S813.

In this embodiment, since the photo viewer 102 does not have any metadata search function, the communication module 307 receives a response "no metadata search function"

from the photo viewer 102 in step S811. For this reason, the process advances to step S813.

In step S813, the search folder management module 303 converts the search folder into a classification folder, and temporarily generates the classification folder in the PC 101.

In step S814, the search folder management module 303 acquires the name information 603 from the search folder selected by the copy instruction, and appends the acquired name to the classification folder generated in step S813.

In step S815, the data management module 301 instructs the search module 302 to execute the search folder selected by the copy instruction.

In step S816, the search module 302 executes search processing based on the search condition set in the search folder selected by the copy instruction, and acquires a list of photo data as a search result. The search module 302 sets the data IDs of all the photo data included in the acquired list in the folder element list 604 of the classification folder temporarily generated in the PC 101 in step S813. As a result, the photo data having the data IDs set in the folder element list 604 can be acquired via the generated classification folder.

In step S817, the data management module 301 transmits the classification folder generated in step S813 to the photo viewer 102 via the communication module 307.

The photo viewer 102 saves the received classification folder in the storage device 207 via the storage module 408. In this embodiment, since the photo data saved in the PC 101 are synchronized with those saved in the photo viewer 102, no more processes are required for the photo viewer 102.

Note that the copy processing to be executed when a classification folder is to be copied, when the external device as the copy destination has the required search function, or when the copy destination as the self device is not covered by the present invention, and a description thereof will not be given.

As can be seen from the above description, the PC 101 according to this embodiment comprises the function of converting a search folder into a classification folder, and then copying the converted classification folder. For this reason, even when a search folder is copied to an external device having no search function, troublesome operations that require the user to manually generate a classification folder, and register data in the generated classification folder can be eliminated.

As a result, the user can copy a search folder by the same operation as a classification folder without considering any differences between classification and search folders, and that between search functions of the two devices.

Second Embodiment

The first embodiment has explained the case in which the external device as the copy destination of the search folder does not have any search function. By contrast, this embodiment will explain a case in which an external device as a copy destination has search functions, but the search functions include different search functions.

<Configuration of Network System>

Figure 9:
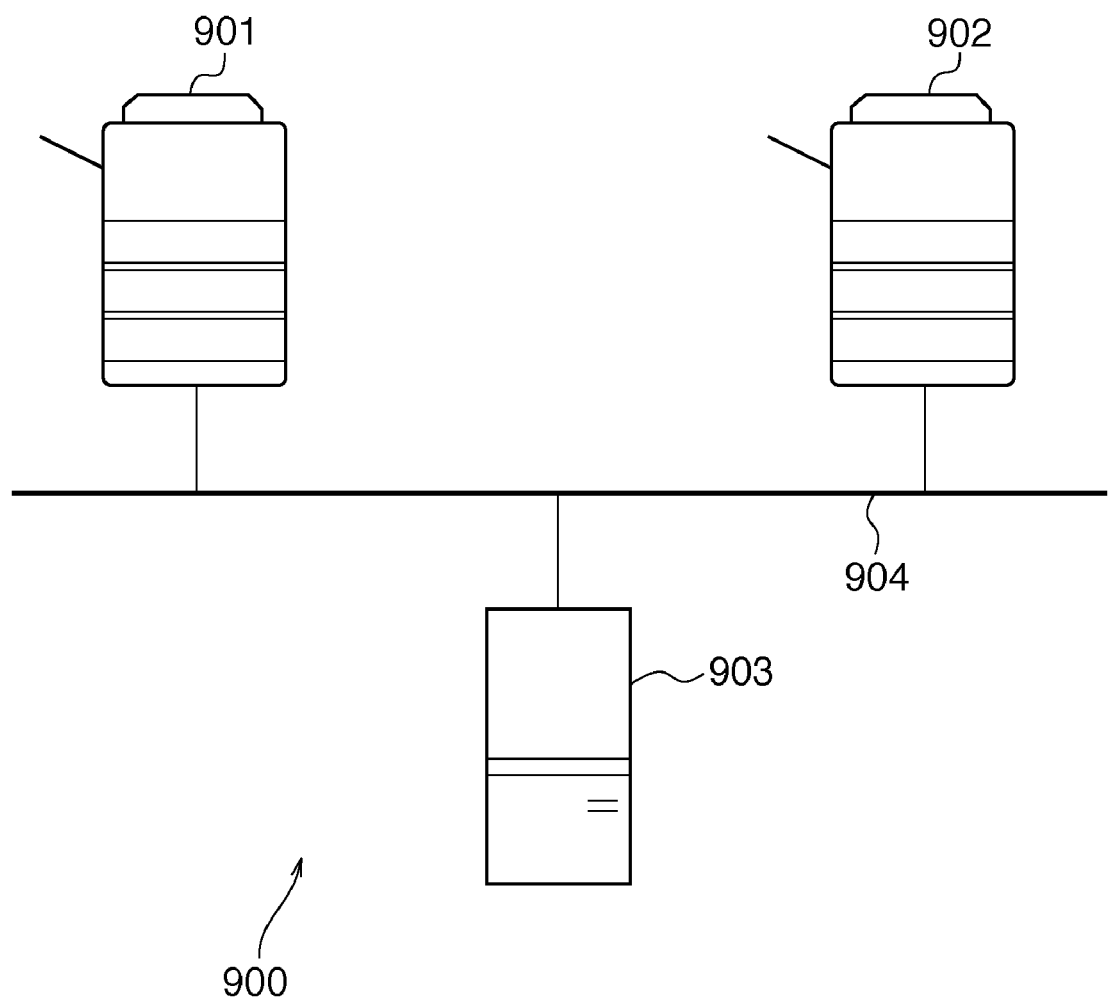
FIG. 9 is a view showing the configuration of a network system 900 which comprises information processing apparatuses according to the second embodiment of the present invention.

FIG. 9 is a view showing the configuration of a network system 900 which comprises information processing apparatuses (multi-function peripherals (MFPs)) according to the second embodiment of the present invention.

Referring to FIG. 9, reference numerals 901 and 902 denote MFPs. Reference numeral 903 denotes a database server. The MFPs 901 and 902 and the database server 903 are connected via a network 904. On the MFPs 901 and 902, a "data management system" as a program required to implement an information processing method according to the present invention is mounted, and this system manages data saved in the database server 903.

<Hardware Arrangement of Each Information Processing Apparatus that Configures Network System 900>

Since the hardware arrangement of each information processing apparatus (MFPs 901 and 902) that configures the network system 900 is basically the same as FIG. 2, a repetitive description thereof will be avoided.

<Module Configuration of Data Management System Mounted on MFP 901>

Figure 10:
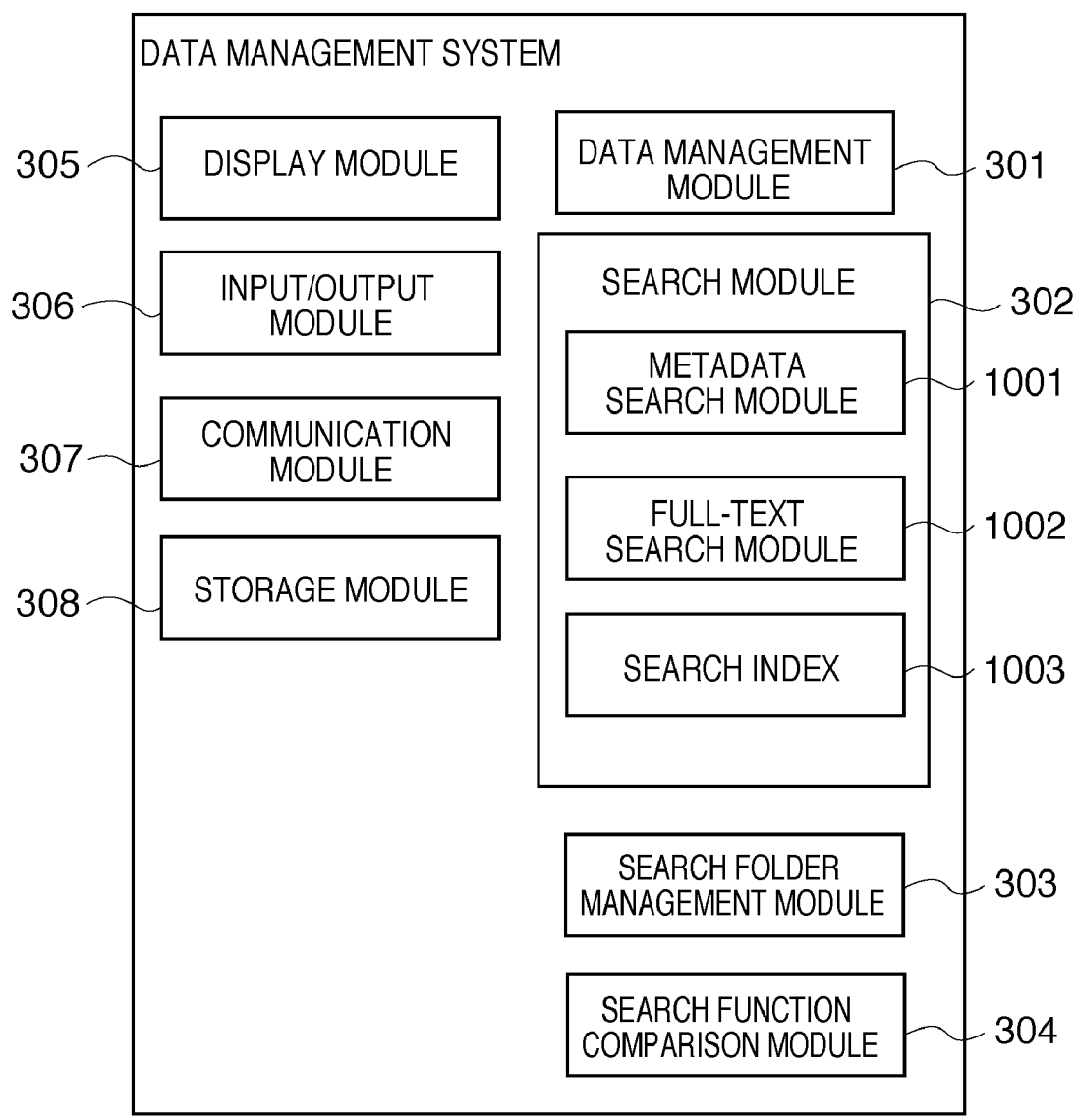
FIG. 10 is a diagram showing the module configuration of a multi-function peripheral (MFP) 901.

FIG. 10 is a diagram showing the module configuration of the data management system mounted on the MFP 901. Since the functions of modules 301 and 303 to 308 are pursuant to FIG. 3, a repetitive description thereof will not be given. In the data management system of the MFP 901, the search module 302 includes a metadata search module 1001 and full-text search module 1002, and the full-text search module 1002 further comprises search index data. In this embodiment, assume that data to be managed are saved in the database server 903, and the storage device 207 stores data depending on functions (search folders and search index data) unique to each information processing apparatus.

<Module Configuration of Data Management System Mounted on MFP 902>

Since the module configuration of the MFP 902 is pursuant to FIG. 10, a repetitive description thereof will be avoided. However, the search module 302 of the MFP 902 has only the metadata search module 1001, and does not have the full-text search module 1002.

<Configuration of Data and Folders to be Managed>

Figure 11:
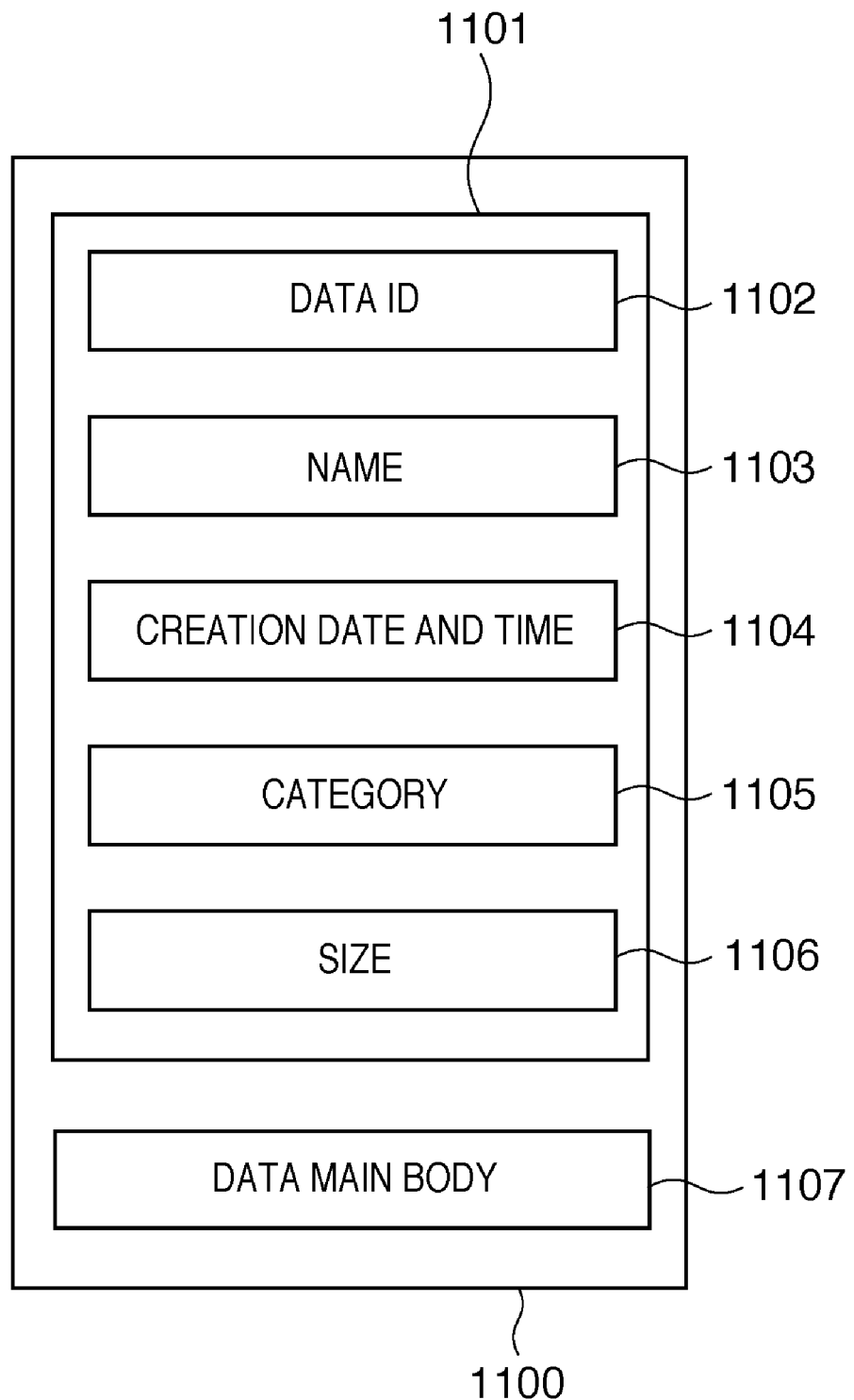
FIG. 11 is a view showing an example of the configuration of data to be managed by the MFP 901.

FIG. 11 is a view showing an example of the configuration of data to be managed by the MFP 901 in this embodiment (assume that data are stored in the database server 903). Data 1100 includes metadata 1101 and main body data 1107.

The metadata 1101 indicates the attributes of the data 1100, and includes attribute information such as data ID information 1102, name information 1103, creation date and time information 1104, category information 1105, size information 1106, and the like. The main body data 1107 is a main body part of the data 1100.

FIG. 12 is a view showing an example of the configuration of a search folder in the MFP 901. In the MFP 901, a search folder 605 allows to set both a metadata search condition included in search condition information 606 and a full-text search condition included in search condition information 1201.

Reference numeral 1202 denotes an example of a search condition. In this example, the logical sum of a metadata search condition and full-text search condition is set as a search condition. Upon opening the search folder 605, both a metadata search and full-text search are conducted, and a list of data excluding redundant data from these search results is acquired as the search result of the search folder 605.

On the other hand, assume that a search folder in the MFP 902 allows setting only a metadata search condition, but does not allow setting a full-text search condition. Since the operation of the search folder in this case is pursuant to that of the search folder described in the first embodiment, a repetitive description thereof will be avoided. In this embodiment, the search folders are stored in the storage devices 207 via the storage modules 308 of the MFPs 901 and 902.

Assume that the search folder of this embodiment can display data that do not match a search condition together with a data set of the search result by explicitly setting these data in the search folder.

<Sequence of Copy Processing of Search Folder to MFP 902 by MFP 901>

The sequence of processing in the data management system upon copying a search folder from the MFP 901 to the MFP 902 will be described below with reference to the flowchart of FIGS. 13A and 13B.

When the user inputs a copy instruction after he or she selects a search folder to be copied on a user interface of the MFP 901 and designates the MFP 902 as a copy destination, the data management module 301 accepts the copy instruction of that search folder in step S1301.

The data management module 301 which accepts the copy instruction of the search folder checks in step S1302 if the selected folder is a classification folder or search folder.

As a result of checking in step S1302, if it is determined that the selected folder is not a search folder, the process branches in step S1303 to end the processing. On the other hand, as a result of checking in step S1302, if it is determined that the selected folder is a search folder, the process branches in step S1303 and advances to step S1304.

In step S1304, the data management module 301 requests the search folder management module 303 to copy the search folder.

In step S1305, the search folder management module 303 checks a copy destination device. As a result of checking in step S1305, if it is determined that the copy destination is a location inside the its own, the process branches in step S1306 to end the processing. On the other hand, as a result of checking in step S1305, if it is determined that the copy destination is an external device, the process branches in step S1306 and advances to step S1307.

In step S1307, the data management module 301 requests the search function comparison module 304 to issue an inquiry about search functions of the external device as the copy destination. Upon reception of the inquiry, the search function comparison module 304 acquires a search condition from the search folder selected by the copy instruction in step S1308. Furthermore, in step S1309, the search function comparison module 304 determines search functions required to execute the search folder based on the acquired search condition. Assume that the search condition 1202 is set in the selected search folder in this case. Therefore, the search function comparison module 304 determines that metadata and full-text search functions are required as the search functions.

In step S1310, the search function comparison module 304 sends an inquiry about the presence/absence of search functions to the MFP 902 via the communication module 307. Under the above assumption, since the MFP 902 has only the metadata search function, it transmits a response:

metadata search: OK
full-text search: NG

In step S1311, the search function comparison module 304 receives an inquiry result from the MFP 902 as the copy destination device. The search function comparison module 304 checks in step S1312 based on the inquiry result received from the MFP 902 as the copy destination device if the copy destination device has all search functions required to execute the search folder.

As a result of checking in step S1312, if it is determined that the copy destination device has all the search functions, the processing ends. On the other hand, as a result of checking in step S1312, if it is determined that the copy destination device has only a partial search function of those required to execute the search folder, the process advances to step S1313.

In step S1313, a search folder set with only a search condition that can be executed by the search function available at the copy destination is generated. In this case, a search folder set with only a search condition for the metadata search function is generated.

Reference numeral 1401 in FIG. 14 denotes a search condition of the search folder generated in step S1313. This search condition is obtained by deleting the search condition (search word="2006 Midterm Plan") for the full-text search from the search condition information 1201. Note that the search folder to be generated has the same name as that of the search folder as the copy source.

In step S1314, data are searched for using the search condition, which is not available at the copy destination device, and data obtained as a result of the search are explicitly set in the search folder generated in step S1310. In this case, data IDs of data obtained by the full-text search are set.

For this purpose, in step S1315 the data management module 301 instructs the search module 302 to conduct a search based on the full-text search condition set in the designated search folder. The search module 302 conducts a search based on the designated full-text search condition, and returns a list of data IDs of the obtained data.

In step S1316, all the data IDs included in the acquired list are set in the search folder generated in step S1313.

In this embodiment, the explicit setting of data in the search folder is implemented by adding the data IDs to the search condition of the search folder as a logical sum. Assume that three data having "DATA__101", "DATA__102", and "DATA__103" as data IDs are obtained by the full-text search, and these data IDs are set in the search folder.

Reference numeral 1501 in FIG. 15 denotes an example of a search condition obtained when data are explicitly set in the search folder. A search condition for the data IDs is added to the search condition 1401 (FIG. 14) as a logical sum. As a result, the data having these data IDs can be acquired via the search folder.

In step S1317, the search folder generated in step S1313 is finally transmitted to the MFP 902 via the communication module 307.

The MFP 902 saves the received search folder in the storage device 207 via the storage module 308 of itself. In this case, assume that new folder ID information 602 of the search folder is issued by the MFP 902. Upon opening the copied search folder on the MFP 902, a search is conducted according to the search condition 1502.

Using such a copy method, even when a search folder is copied to the MFP 902 which does not have any full-text search function, data obtained by the full-text search on the MFP 901 are not omitted. That is, on the MFP 902 as well, "DATA__101", "DATA__102", and "DATA__103" can be obtained as the execution result of the search folder.

Figure 13A:
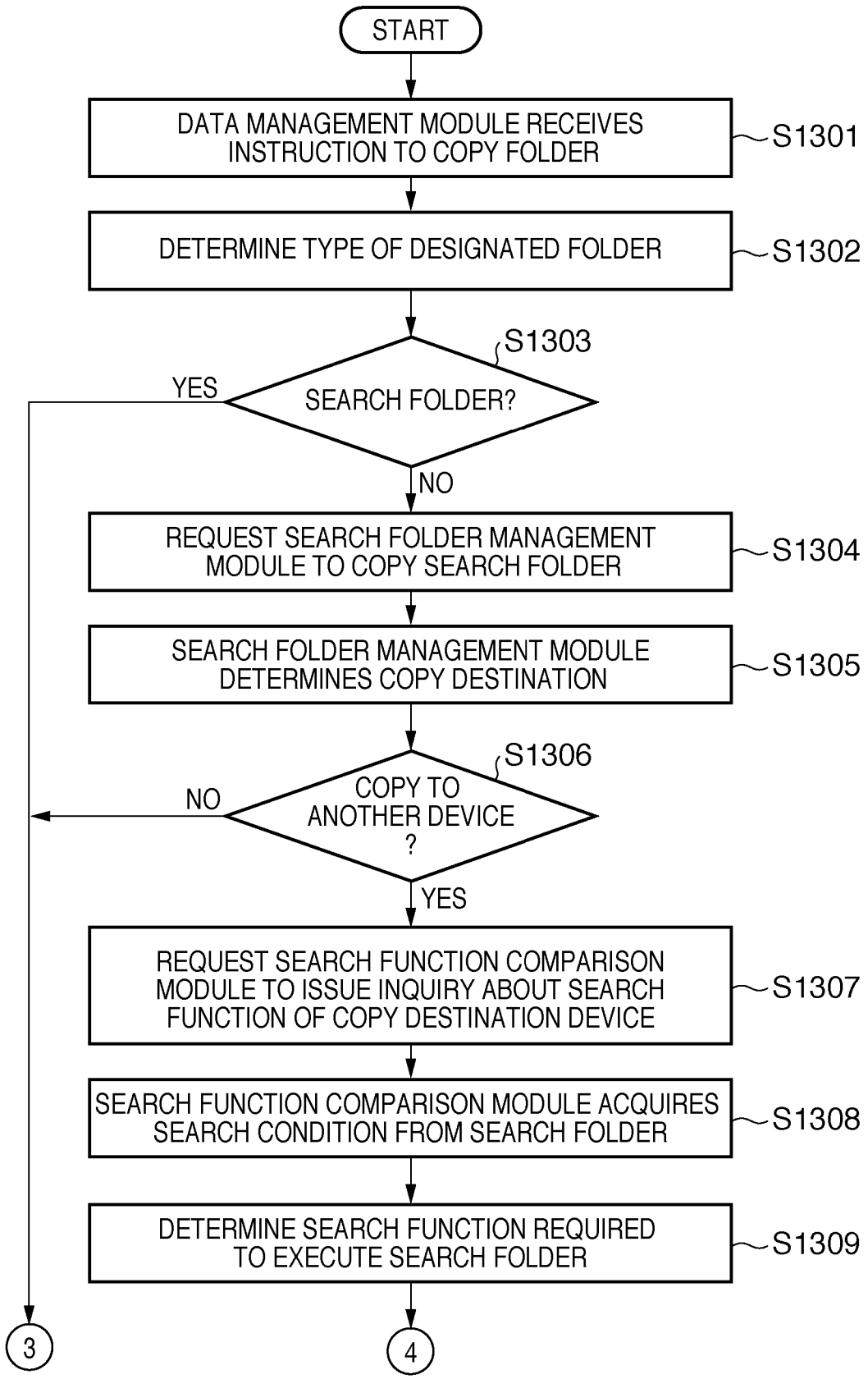
FIGS. 13A and 13B are flowchart showing the sequence of copy processing of a search folder in the MFP 901 to an MFP 902.
Figure 13B:
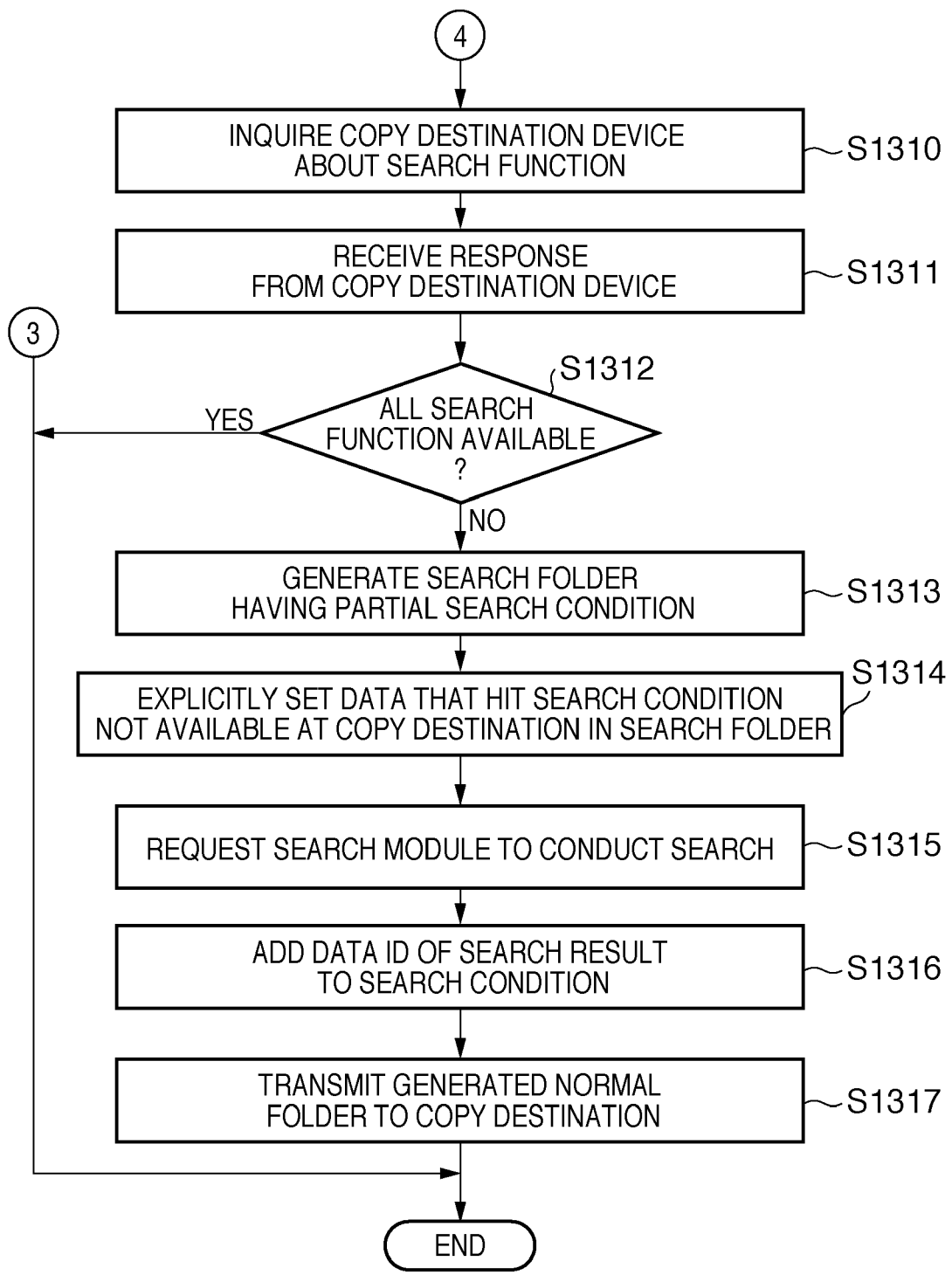

In the description of FIGS. 13A and 13B, all the data IDs of data obtained by the full-text search conducted in step S1315 are added. However, data IDs of data obtained by a metadata search may be excluded.

As can be seen from the above description, according to this embodiment, the user can copy a search folder to an external device by the same operation as a classification folder without regarding any differences between classification and search folders, and that between search functions of the two devices.

According to this embodiment, even when the copy destination device does not have a partial search function of the search functions, data obtained by the search folder of the copy source can be prevented from being omitted from the execution result of the copied search folder.

Third Embodiment

The second embodiment has explained the case in which the copy destination device does not have a partial search function of search functions as the difference of the search functions from the copy destination device. However, the present invention is not limited to such specific case. For example, the present invention is applicable to a case in which two devices have identical search functions but the specifications of these search functions are different. Details of this embodiment will be described below.

The configuration of the network system in this embodiment is pursuant to FIG. 9. However, assume that both the MFPs 901 and 902 have only a metadata search function. Also, assume that the metadata search functions of the MFPs 901 and 902 have different specifications in this embodiment.

In this case, assume that the MFP 901 has a specification that allows conducting a metadata search by normalizing a variant character, while the MFP 902 does not have a specification that allows conducting a metadata search by normalizing a variant character.

FIG. 16 shows a search condition set in a search folder to be copied. In the MFP 901 which can normalize a variant character, both "三国志 (Three Kingdoms)" and "三國志 (Three Kingdoms)" turn up with respect to a character string "三国志 (Three Kingdoms)" designated as a match condition of a name.

Hence, upon copying a search folder in which characters having a variant character are designated as a search condition to the MFP 902, the search condition is converted to expand the match condition in correspondence with a variant character.

Reference numeral 1602 denotes a converted search condition. As shown in the search condition 1602, a match condition is converted so as to conduct a search using both character strings "三国志 (Three Kingdoms)" and "三國志 (Three Kingdoms)". The search folder set with this search condition is copied to the MFP 902.

Whether or not to normalize a variant character has been exemplified as different specifications of the search functions. However, an embodiment to which the present invention is applicable is not limited to this. For example, the present invention can be similarly applied to a case in which search functions have different specifications as to whether or not to normalize synonyms or similar terms.

Fourth Embodiment

In the description of the above embodiments, a device is designated as the copy destination. However, the present invention is not limited to this. For example, the present invention can also be applied to a case in which a specific folder of a device is designated as the copy destination, and a search folder is copied to a lower layer of that folder.

Fifth Embodiment

In the second embodiment, upon explicitly adding data to a search folder, a match condition based on each data ID is added to the search condition. However, the present invention is not limited to this. For example, a search folder may be configured to have a folder element list 604, and the data IDs of data to be explicitly added may be set in the folder element list.

Sixth Embodiment

In the above embodiments, an inquiry about search functions is issued to the copy destination device at the time of copying of a search folder. However, the present invention is not limited to this. For example, information associated with search functions may be exchanged with each other at the time of establishment of connection of devices.

Seventh Embodiment

In the above embodiments, when search functions have a difference from those of the copy destination device, the data management system automatically converts a search folder according to a predetermined method, and copies the converted search folder. However, the present invention is not limited to this. For example, an arrangement that may inquire the user about a copy method may be adopted. Note that an embodiment which comprises an input/output unit or the like required for such inquiry is included in the scope of the present invention.

Other Embodiments

Note that the present invention may be applied to either a system constituted by a plurality of devices (e.g., a host computer, interface device, reader, printer, and the like), or an apparatus consisting of a single device (e.g., a copying machine, facsimile apparatus, or the like).

The objects of the present invention are also achieved by supplying a storage medium, which records a program code of software that implements the functions of the aforementioned embodiments to the system or apparatus. In this case, the functions are implemented when a computer (or a CPU or MPU) of the system or apparatus reads out and executes the program code stored in the storage medium. Note that the storage medium that stores the program code constitutes the present invention in such case.

As the computer-readable storage medium for supplying the program code, for example, a Floppy® disk, hard disk, optical disk, magneto-optical disk, CD-ROM, CD-R, magnetic tape, nonvolatile memory card, ROM, and the like may be used.

The present invention is not limited to the case in which the functions of the aforementioned embodiments are implemented when the computer executes the readout program code. For example, the present invention also includes a case wherein an OS (operating system) or the like running on a computer may execute some or all of actual processes based on an instruction of the program code to implement the functions of the aforementioned embodiments.

Furthermore, the present invention also includes a case wherein the functions of the aforementioned embodiments are implemented after the program code read out from the storage medium is written in a memory equipped on a function expansion board or unit, which is inserted into or connected to the computer. That is, the present invention includes a case wherein after the program code is written in the memory, a CPU or the like equipped on the function expansion board or unit executes some or all of actual processes based on an instruction of the program code, so as to implement the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-298595 filed on Nov. 16, 2007, which is hereby incorporated by references herein in its entirety.

What is claimed is:

1. An information processing apparatus which is connected to an external device to be able to communicate with each other, comprising:
- a determination unit configured to determine, when an instruction is input to copy a search folder used to search data based on set search conditions to the external device, whether or not the external device has a search function required to execute the search folder based on set search conditions;
- a generation unit configured to generate a folder to be transmitted to the external device based on the instruction;
- a search unit configured to search, when the determination unit determines that the external device does not have at least one search function required to execute the search folder based on set search conditions, data based on a corresponding search condition of the search conditions set in the search folder, wherein said at least one search function that the external device does not have is used to search data based on the corresponding search condition;
- a setting unit configured to set information associated with data obtained by the search by said search unit in the generated folder so that the data, which can be searched based on the search conditions set in the search folder, can be acquired via the generated folder at the external device; and
- a transmission unit configured to transmit the generated folder set with the information associated with the data by said setting unit to the external device.

2. The apparatus according to claim 1, wherein when said determination unit determines that the external device does not have all search functions required to execute the search folder based on set search conditions, said generation unit generates the folder as a classification folder used to classify data.

3. The apparatus according to claim 1, wherein when said determination unit determines that the external device does not have a partial search function required to execute the search folder based on set search conditions, said generation unit generates the folder as a search folder.

4. The apparatus according to claim 3, wherein said setting unit sets, in the generated search folder, only a search condition where the search folder will be able to search data at the external device based on the search condition of the search conditions set in the search folder.

5. The apparatus according to claim 1, wherein said setting unit sets, as the information associated with the data, identifiers used to identify the data obtained by the search by said search unit in the generated folder.

6. An information processing method in an information processing apparatus which is connected to an external device to be able to communicate with each other, comprising:
- determining, when an instruction is input to copy a search folder used to search data based on set search conditions to the external device, whether or not the external device has search function required to execute the search folder based on set search conditions;
- generating a folder to be transmitted to the external device based on the instruction;
- searching, when it is determined that the external device does not have at least one search function required to execute the search folder based on set search conditions, data based on a corresponding search condition of the search conditions set in the search folder, wherein said at least one of search function that the external device does not have is used to search data based on the corresponding search condition;
- setting information associated with data obtained in the searching step in the generated folder so that the data, which can be searched based on the search conditions set in the search folder, can be acquired via the generated folder at the external device; and
- transmitting the generated folder set with the information associated with the data in the setting step to the external device.

7. A program stored in a computer-readable storage medium, which, when executed by a processor, will cause a computer to execute the information processing method according to claim 6.

8. A non-transitory computer-readable storage medium storing a program which, when executed by a processor, will cause a computer to execute the information processing method according to claim 6.

* * * * *